(12) United States Patent
Pyo et al.

(10) Patent No.: US 8,840,394 B2
(45) Date of Patent: Sep. 23, 2014

(54) INJECTION MOLDING APPARATUS HAVING A PLATE HEATER AND HAVING A COOLING PASSAGE OR AN INSULATION SPACE

(75) Inventors: Jin Soo Pyo, Seoul (KR); Jong Won Lee, Seoul (KR); Jin Hyun Cho, Seoul (KR); Jin Sub Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 40 days.

(21) Appl. No.: 13/475,398

(22) Filed: May 18, 2012

(65) Prior Publication Data
US 2012/0294976 A1 Nov. 22, 2012

(30) Foreign Application Priority Data
May 20, 2011 (KR) .................... 10-2011-0047975

(51) Int. Cl.
*B29C 45/73* (2006.01)
(52) U.S. Cl.
CPC ......... *B29C 45/73* (2013.01); *B29C 2045/7368* (2013.01)
USPC ...................... 425/547; 264/328.16; 425/548
(58) Field of Classification Search
CPC  B29C 45/7312; B29C 45/27; B29C 45/2737; B29C 45/0001

USPC ......... 425/547, 548, 549; 264/328.14, 328.16
See application file for complete search history.

(56) References Cited

U.S. PATENT DOCUMENTS

| | | | | |
|---|---|---|---|---|
| 5,716,651 | A * | 2/1998 | McGrevy | 425/549 |
| 7,540,989 | B2 * | 6/2009 | Kang | 264/328.16 |
| 8,052,415 | B2 * | 11/2011 | Chen et al. | 425/547 |

FOREIGN PATENT DOCUMENTS

| | | |
|---|---|---|
| KR | 10-0644920 B1 | 11/2006 |
| KR | 10-0792077 B1 | 1/2008 |
| KR | 10-2009-0010438 A | 1/2009 |
| KR | 10-2011-0029450 A | 3/2011 |

OTHER PUBLICATIONS

Communication dated Nov. 20, 2012 issued by the International Searching Authority in International Patent Application No. PCT/KR2012/003892.

\* cited by examiner

*Primary Examiner* — Tim Heitbrink
(74) *Attorney, Agent, or Firm* — Sughrue Mion, PLLC

(57) ABSTRACT

An injection molding apparatus is provided. The injection molding apparatus includes a mold, a plate heater mounted to the mold to heat the mold, and a cooling passage provided above or below the plate heater.

13 Claims, 5 Drawing Sheets

INJECTION MOLDING APPARATUS HAVING A PLATE HEATER AND HAVING A COOLING PASSAGE OR AN INSULATION SPACE

CROSS-REFERENCE TO RELATED APPLICATION

This application claims priority from Korean Patent Application No. 2011-0047975, filed on May 20, 2011 in the Korean Intellectual Property Office, the disclosure of which is incorporated herein by reference.

BACKGROUND

1. Field

Apparatuses consistent with exemplary embodiments relate to an injection molding apparatus equipped with a heater to heat a mold and a cooling device to cool the mold after an injection process.

2. Description of the Related Art

Generally, an injection molding apparatus is configured to inject molten resin into a cavity formed in a mold, thereby producing resin products having a shape corresponding to the cavity.

An injection molding apparatus may include a first mold and a second mold cooperatively defining a cavity, and an injection unit to inject molten resin into the cavity. The molten resin in the cavity is cooled and coagulated. As a result, resin products having a shape corresponding to the cavity are produced.

The injection molding apparatus may further include a heater to heat the mold and a cooling device to control a cooling rate of the molten resin during the injection molding process, in order to improve the appearance of molded products.

SUMMARY

One or more exemplary embodiments provide an injection molding apparatus capable of more rapidly achieving heating and cooling.

One or more exemplary embodiments also provide an injection molding apparatus in which a heater and a cooling passage to heat and cool a mold may be easily mounted.

In accordance with an aspect of an exemplary embodiment, there is provided an injection molding apparatus including a first mold, a second mold engaged with the first mold so that a cavity is defined between the first and the second molds, and a plate heater mounted to at least one of the first mold and the second mold.

At least one of the first mold and the second mold may include a mold part having a mold surface to define the mold cavity, and a base part coupled to a surface of the mold part opposite to the mold surface. The plate heater may be mounted between the mold part and the base part.

The injection molding apparatus may further include a cooling passage formed between the plate heater and the base part.

The base part may be formed with a cooling recess to form the cooling passage, and the cooling passage may be defined by a surface of the plate heater and the cooling recess.

The plate heater may include a base plate to cover the cooling recess, and a heating part formed by performing patterning of the base plate.

The injection molding apparatus may further include a cooling passage formed between the plate heater and the mold part.

The mold part may be formed with a cooling recess to form the cooling passage, and the cooling passage may be defined by a surface of the plate heater and the cooling recess.

The injection molding apparatus may further include an insulation space formed between the plate heater and the base part.

The base part may be formed with an insulation recess to form the insulation space.

The plate heater may include a base plate to cover the cooling recess, and a heating part formed by performing patterning of the base plate.

The cooling recess may be provided in plural and the plurality of cooling recesses may be arranged in parallel.

In accordance with an aspect of another exemplary embodiment, there is provided an injection molding apparatus including a mold to define a mold cavity, a plate heater mounted to the mold to heat the mold, and an insulation space to insulate of heat from the plate heater, the insulation space being formed in the mold.

In accordance with an aspect of another exemplary embodiment, there is provided an injection molding apparatus including a mold to define a mold cavity, a plate heater mounted to the mold to heat the mold, and a cooling passage formed in the mold so as to contact the plate heater to cool the mold.

BRIEF DESCRIPTION OF THE DRAWINGS

These and/or other aspects will become apparent and more readily appreciated from the following description of exemplary embodiments, taken in conjunction with the accompanying drawings of which.

DETAILED DESCRIPTION

Figure 1:
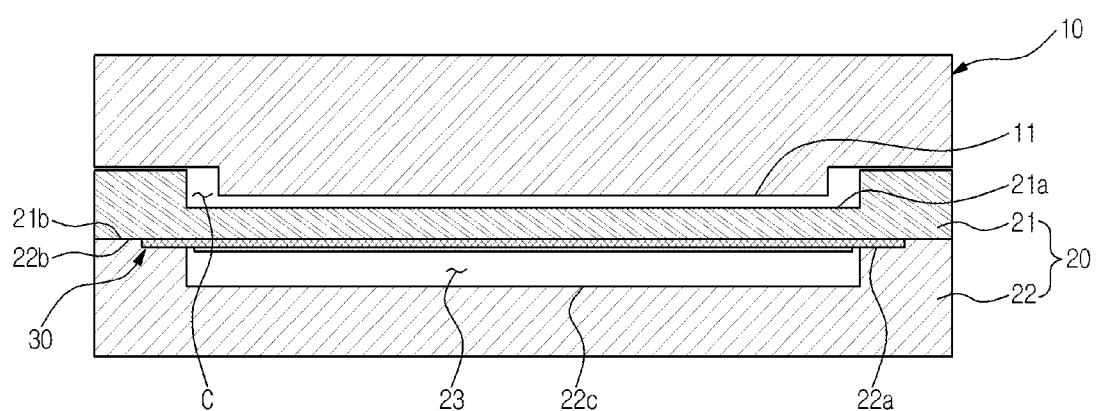
FIG. 1 is a sectional view showing an injection molding apparatus according to an exemplary embodiment.

Reference will now be made in detail to exemplary embodiments with reference to the accompanying drawings, wherein like reference numerals refer to like elements throughout.

Figure 2:
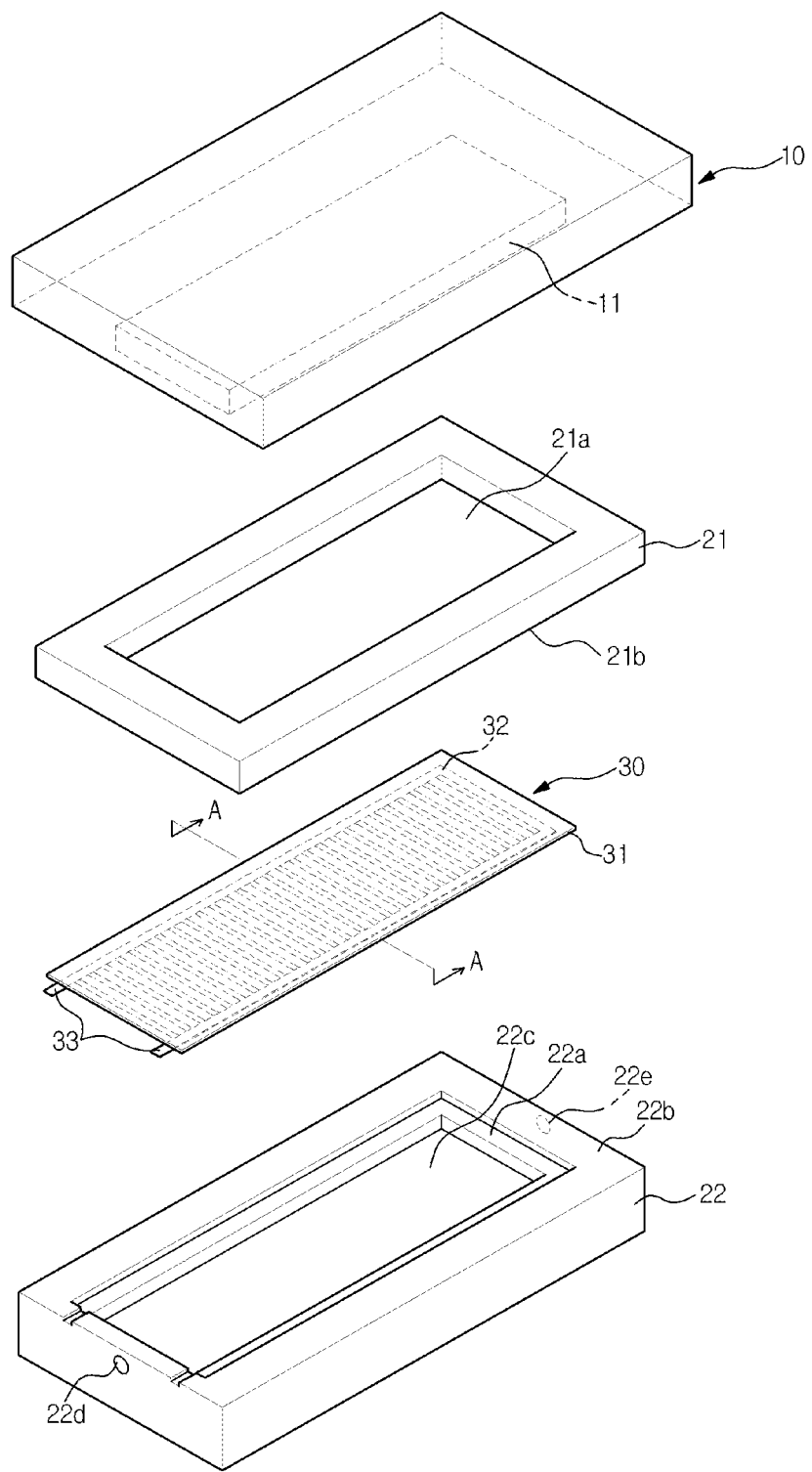
FIG. 2 is an exploded perspective view showing the injection molding apparatus according to the exemplary embodiment.
Figure 3:
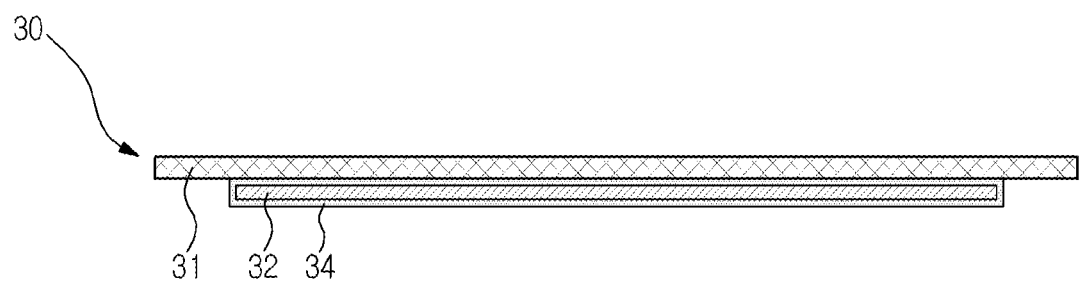
FIG. 3 is a sectional view taken along line A-A' in FIG. 2.

As shown in FIG. 1 through FIG. 3, an injection molding apparatus according to an exemplary embodiment includes a first mold 10 and a second mold 20 cooperatively defining a mold cavity C in which products are molded.

At least one of the first mold 10 and the second mold 20 may move so that the first mold 10 and the second mold 20 are engaged with each other and disengaged from each other. The mold cavity C defined between the first mold 10 and the second mold 20 has a shape corresponding to a shape of a product to be molded. The mold cavity C is filled with a molten material, such as molten resin, and the molten material is then coagulated to form a molded product (not shown).

The first mold 10 includes a core 11 to form an inner surface of the molded product, and the second mold 20 includes a mold surface 21a to form an outer surface of the molded product. The injection molding apparatus further includes a plate heater 30 mounted to the second mold 20.

The second mold 20 includes a mold part 21 including the mold surface 21a, and a base part 22. The mold part 21 further includes a coupling surface 21b formed opposite to the mold surface 21a. The base part 22 is coupled to the coupling surface 21b of the mold part 21. The plate heater 30 is mounted between the mold part 21 and the base part 22.

The mold part 21 and the base part 22 are engaged with each other using fasteners such as bolts or using various engaging methods such as diffusion bonding, blazing, welding or the like.

The base part 22 includes a coupling surface 22b which comes into contact with the coupling surface 21b of the mold part 21, and a heater receiving recess 22a which steps down inwardly from the coupling surface 22b. The heater receiving recess 22a has an area in which the plate heater 30 is accommodated. Also, the heater receiving recess 22a has a depth corresponding to a thickness of the plate heater 30. Accordingly, when the plate heater 30 is received in the heater receiving recess 22a, the coupling surface 22b of the base part 22 comes into close contact with the coupling surface 21b of the mold part 21 without a step difference between the plate heater 30 and the coupling surface 22b of the base part 22.

The second mold 20 further includes a cooling passage 23 to cool the second mold 20. The cooling passage 23 is located below the plate heater 30.

The base part 22 further includes a cooling recess 22c to define the cooling passage 23. The cooling recess 22c steps down inwardly with a certain depth from the heater receiving recess 22a. When the plate heater 30 is received in the heater receiving recess 22a, the plate heater 30 covers the cooling recess 22c, thereby defining the cooling passage 23.

In the above-described structure, in which the second mold 20 is formed by engaging the mold part 21 and the base part 22 which are separately provided, the cooling recess 22c is formed at the base part 22 and the plate heater 30 defines a portion of the cooling passage 23, securing a space for heater installation and forming the cooling passage 23 may be easily achieved, in comparison with a constitution of forming holes through the second mold 20 for heater installation and formation of the cooling passage. Also, a distance from the plate heater 30 and the cooling passage 23 to the mold cavity may be decreased in the range of about 5 mm to about 10 mm, thereby achieving rapid heat transfer with the mold cavity.

The base part 22 further includes an inlet 22d through which cooling water flows into the cooling passage 23, and an outlet 22e through which cooling water is discharged from the cooling passage 23. The inlet 22d and the outlet 22e are connected with a cooling water pump (which will be described later) by cooling water lines (not shown).

In order to seal a gap between the plate heater 30 and the heater receiving recess 22a, a sealing member such as a gasket (not shown) may be inserted therebetween. The plate heater 30 and the base part 22 may be engaged with each other using screws.

The plate heater 30 includes a base plate 31, a heating part 32 and terminals 33. The base plate 31 has an area larger than that of the cooling recess 22c so as to sealingly cover an upper portion of the cooling passage 23 when the plate heater 30 is received in the heater receiving recess 22a. The heating part 32 is formed by performing patterning of a surface of the base plate 31. The heating part 32 generates heat when electric power is applied thereto. The terminals 33 are provided at an end portion of the base plate 31 and electrically connected to the heating part 32 to apply electric power to the heating part 32.

The base plate 31 may be made of a metallic material having high heat conductivity for rapid heat transfer with the mold part 21. The heating part 32 may be formed by performing patterning of the base plate 31 using a material having electric resistance to generate a large amount of heat required to heat the second mold 20.

The plate heater 30 further includes an insulation layer 34. The insulation layer 34 is formed on an outer surface of the heating part 32 and between the base plate 31 and the heating part 32. The insulation layer 34 may be formed by coating the heating part 32 with a film made of an electric insulation material such as a resin.

If the plate heater 30 is used to heat the second mold 20 as described above, a heat radiation area of the heater and a heat transfer area for transferring heat from the heater to the mold may be remarkably enlarged, thereby achieving rapid heat transfer to the mold cavity C. As a result, time for heating the second mold 20 may be remarkably shortened.

Also, since the plate heater 30 may be formed in a thin plate shape, a space occupied by the plate heater 30 between the mold cavity C and the cooling passage 23 may be small. Accordingly, a distance between the mold cavity C and the cooling passage 23 may be remarkably decreased in comparison with a constitution of using a general rod type heater. Also, since the plate heater 30 has low thermal resistance, the second mold 20 may be rapidly cooled by a cooling fluid passing through the cooling passage 23.

In the above-mentioned exemplary embodiment, the heating part 32 is disposed on a lower surface of the base plate 31 so as to define a portion of the cooling passage 23, however the embodiment is not restricted thereto. The heating part 32 may be disposed on an upper surface of the base plate 31 so as to contact the coupling surface 21b of the mold part 21. The heating part 32 may also be disposed on both the upper and lower surfaces of the base plate 31.

Figure 4:
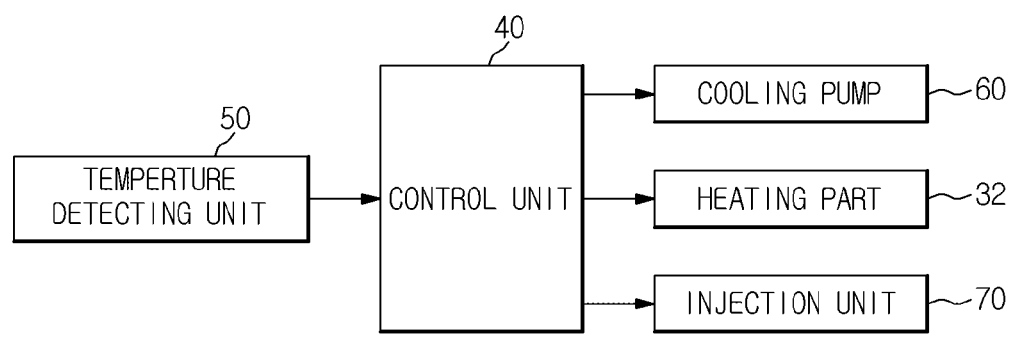
FIG. 4 is a control block diagram of the injection molding apparatus according to the exemplary embodiment.

As shown in FIG. 4, the injection molding apparatus further includes a control unit 40 to control the operation thereof, a temperature detecting unit 50 to detect temperatures of the molds 10 and 20, and a cooling pump 60 to supply a cooling fluid to the cooling passage 23.

Hereinafter, the control and operation of the injection molding apparatus with the above-stated construction will be described in detail with reference to the accompanying drawings.

The control unit 40 applies electric power to the heating part 32 so as to preheat the second mold 20 by resistance heat generated from the heating part 32. If it is determined that a temperature of the second mold 20 reaches a preset temperature by the temperature detecting unit 20, the control unit 40 shuts off supply of electric power to the heating part 32, and controls an injection unit 70 to inject molten resin into the mold cavity C. When the injection of the molten resin is completed, the control unit 40 controls the cooling pump 70 to supply a cooling fluid to the cooling passage 23. The molten resin in the molds 10 and 20 and the mold cavity C is cooled by the cooling fluid supplied to the cooling passage 23, and accordingly, the molten resin is coagulated. As a result, a product having a shape corresponding to the mold cavity C is produced.

Figure 5:
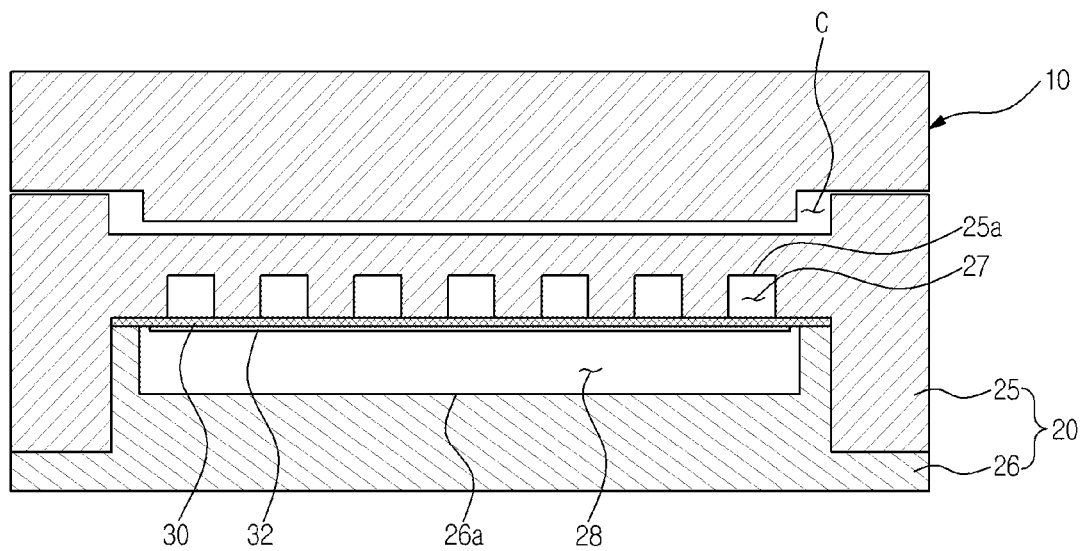
FIG. 5 is a sectional view showing a constitution of an injection molding apparatus according to another exemplary embodiment.

As shown in FIG. 5, an injection molding apparatus according to another exemplary embodiment has the same constitution as the previous embodiment, in which the second mold 20 is formed by separably engaging a mold part 25 and a base part 26 with each other and the plate heater 30 is mounted between the mold part 25 and the base part 26. However, different from the previous embodiment, a cooling passage 27 is formed above the plate heater 30 in this embodiment.

The mold part 25 is formed with cooling recesses 25a to define the cooling passage 27. In consideration of heat transfer between the plate heater 30 and the mold cavity C, the cooling recesses 25a are provided in plural in a longitudinal direction of the plate heater 30 and are connected in parallel, thereby forming the cooling passage 27. When the cooling passage 27 is formed at the mold part 25, an inlet (not shown) and an outlet (not shown) to circulate a cooling fluid through the cooling passage 27 may also be formed at the mold part 25.

The base part 26 disposed below the plate heater 30 is formed with an insulation recess 26a to form an insulation space 28 below the plate heater 30. The insulation space 28 blocks heat from the plate heater 30 to a downward direction opposite to the mold cavity C, thereby promoting rapid heating of the mold cavity C.

The insulation space 28 may be filled with a gas having a low heat transfer rate, such as air. In some cases, the insulation space 28 may serve as a cooling passage to which a cooling fluid is supplied for the purpose of rapid cooling.

The insulation space 28 may have a cross-sectional area corresponding to an area in which the heating part 32 of the plate heater 30 is formed, so that the heating part 32 is in contact with the air inside the insulation space 28. In such a case, the insulation space 28 may have a shape similar to the shape of the cooling passage 23 (refer to FIG. 1) of the previous embodiment.

The above-described embodiments have a constitution in which the cooling passage 23 or 27 and the plate heater 30 are disposed only at the second mold 20, however the embodiment is not restricted thereto. The cooling passage 23 or 27 and the plate heater 30 may be disposed only at the first mold 10, or may be disposed at both the first mold 10 and the second mold 20.

Although a few exemplary embodiments have been shown and described, it would be appreciated by those skilled in the art that changes may be made in these embodiments without departing from the principles and spirit of the inventive concept, the scope of which is defined in the claims and their equivalents.

What is claimed is:

1. An injection molding apparatus comprising:
   a first mold;
   a second mold engaged with the first mold so that a cavity is defined between the first and the second molds; and
   a plate heater mounted to at least one of the first mold and the second mold,
   wherein the plate heater comprises a base plate having a thin and flat shape, and a heating part patterned on a flat surface of the base plate.

2. The injection molding apparatus according to claim 1, wherein at least one of the first mold and the second mold comprises a mold part having a mold surface to define the mold cavity, and a base part coupled to a surface of the mold part opposite to the mold surface, and
   the plate heater is mounted between the mold part and the base part.

3. The injection molding apparatus according to claim 2, further comprising:
   a cooling passage provided between the plate heater and the base part.

4. The injection molding apparatus according to claim 3 wherein the base part includes at least one cooling recess defining the cooling passage, and the cooling passage is defined by a surface of the plate heater and the cooling recess.

5. The injection molding apparatus according to claim 4, wherein the base plate of the plate heater is configured to cover the cooling recess.

6. An injection molding apparatus comprising:
   a first mold;
   a second mold engaged with the first mold so that a cavity is defined between the first and the second molds;
   a plate heater mounted to at least one of the first mold and the second mold,
   wherein at least one of the first mold and the second mold comprises a mold part having a mold surface to define the mold cavity, and a base part coupled to a surface of the mold part opposite to the mold surface,
   wherein the plate heater comprises a base plate, and a heating part patterned on a flat surface of the base plate, and
   wherein the plate heater is mounted between the mold part and the base part; and
   a cooling passage provided between the plate heater and the mold part.

7. The injection molding apparatus according to claim 6, wherein the mold part includes at least one cooling recess forming the cooling passage, and
   the cooling passage is defined by a surface of the plate heater and the cooling recess.

8. The injection molding apparatus according to claim 6, further comprising:
   an insulation space provided between the plate heater and the base part.

9. The injection molding apparatus according to claim 8, wherein the base part includes an insulation recess forming the insulation space.

10. The injection molding apparatus according to claim 7, wherein the base plate of the plate heater covers the cooling recess.

11. The injection molding apparatus according to claim 7, wherein the mold part includes a plurality of cooling recesses arranged in parallel.

12. An injection molding apparatus comprising:
    a first mold;
    a second mold engaged with the first mold so that a mold cavity is defined between the first and the second molds; and
    a plate heater mounted to at least one of the first mold and the second mold,
    wherein the plate heater comprises a base plate, and a heating part patterned on a flat surface of the base plate,
    wherein at least one of the first mold and the second mold comprises a mold part having a mold surface to define the mold cavity, and a base part coupled to a surface of the mold part opposite to the mold surface, and
    wherein the base part includes at least one insulation recess defining an insulation space configured to insulate heat from the plate heater, and the insulation space is filled with a gas or fluid.

13. An injection molding apparatus comprising:
    a first mold;
    a second mold engaged with the first mold so that a cavity is defined between the first and the second molds;
    a plate heater mounted to at least one of the first mold and the second mold; and
    a cooling passage,
    wherein the plate heater comprises a base plate, and a heating part patterned on a flat surface of the base plate,
    wherein at least one of the first mold and the second mold comprises a mold part having a mold surface to define the mold cavity, and a base part coupled to a surface of the mold part opposite to the mold surface, and
wherein the mold part includes at least one cooling recess defining the cooling passage.

* * * * *